United States Patent
Mamidwar et al.

(10) Patent No.: US 9,985,996 B2
(45) Date of Patent: May 29, 2018

(54) DECOUPLING AUDIO-VIDEO (AV) TRAFFIC PROCESSING FROM NON-AV TRAFFIC PROCESSING

(71) Applicant: BROADCOM CORPORATION, Irvine, CA (US)

(72) Inventors: Rajesh Shankarrao Mamidwar, San Diego, CA (US); Darren Duane Neuman, Palo Alto, CA (US); Flaviu Dorin Turean, Palo Alto, CA (US); David ChaoHua Wu, San Diego, CA (US); Anand Tongle, San Diego, CA (US); Sanjeev Sood, San Diego, CA (US); Prashant Katre, San Diego, CA (US); Predrag Kostic, Burnaby (CA)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 507 days.

(21) Appl. No.: 14/151,690

(22) Filed: Jan. 9, 2014

(65) Prior Publication Data
US 2015/0071296 A1  Mar. 12, 2015

Related U.S. Application Data

(60) Provisional application No. 61/875,666, filed on Sep. 9, 2013.

(51) Int. Cl.
H04L 29/06 (2006.01)
(52) U.S. Cl.
CPC .......... *H04L 65/1023* (2013.01); *H04L 65/60* (2013.01)

(58) Field of Classification Search
None
See application file for complete search history.

(56) References Cited

U.S. PATENT DOCUMENTS

| 8,259,761 B2* | 9/2012 | Diab ................ H04L 12/2805 |
| | | 370/474 |
| 2003/0014264 A1* | 1/2003 | Fujii .................... H04N 19/44 |
| | | 704/500 |

(Continued)

OTHER PUBLICATIONS

"Stream Processing", retrieved from <en.wikipedia.org/w/index.php?title=Stream_processing&printable=yes> on Sep. 6, 2013, 11 pages.

(Continued)

*Primary Examiner* — Chirag Shah
*Assistant Examiner* — Srinivasa Reddivalam
(74) *Attorney, Agent, or Firm* — McDermott Will & Emery LLP

(57) ABSTRACT

A device for decoupling audio-video (AV) traffic processing from non-AV traffic processing may include a first processor and a second processor. The first processor may be configured to establish a network connection with a client device, determine whether the network connection is associated with AV traffic, transfer the network connection to a second processor when the network connection is associated with AV traffic, and process non-AV traffic associated with the network connection when the network connection is not associated with AV traffic. The second processor may be configured to receive the network connection from the first processor and process the AV traffic associated with the network connection.

20 Claims, 10 Drawing Sheets

(56) References Cited

U.S. PATENT DOCUMENTS

| | | | | |
|---|---|---|---|---|
| 2008/0109562 A1* | 5/2008 | Ramakrishnan | ........ | H04L 49/90 709/250 |
| 2008/0192726 A1* | 8/2008 | Mahesh | .............. | H04L 12/6418 370/349 |
| 2011/0265129 A1* | 10/2011 | Na | ...................... | H04L 12/2836 725/80 |
| 2013/0064306 A1* | 3/2013 | Mamidwar | .......... | H04N 19/152 375/240.26 |
| 2013/0097633 A1* | 4/2013 | Kostic | .................... | H04N 7/106 725/32 |
| 2014/0282801 A1* | 9/2014 | Bowler | ............ | H04B 10/25751 725/129 |
| 2015/0074737 A1* | 3/2015 | Dua | ...................... | H04N 7/163 725/110 |

OTHER PUBLICATIONS

Rixner, "Stream Processor Architecture", Rice University, Aug. 1, 2001, 134 pages.

\* cited by examiner

US 9,985,996 B2

DECOUPLING AUDIO-VIDEO (AV) TRAFFIC PROCESSING FROM NON-AV TRAFFIC PROCESSING

CROSS-REFERENCE TO RELATED APPLICATIONS

The present application claims the benefit of U.S. Provisional Patent Application Ser. No. 61/875,666, entitled "Decoupling Audio-Video (AV) Traffic Processing from Non-AV Traffic Processing," filed on Sep. 9, 2013, which is hereby incorporated by reference in its entirety for all purposes.

TECHNICAL FIELD

The present description relates generally to decoupling audio-video (AV) traffic from non-AV traffic, and more particularly, but not exclusively, to decoupling AV traffic processing from non-AV traffic processing in a gateway device.

BACKGROUND

Home gateway devices, such as cable subscriber set top boxes (STBs), may include a general purpose host processor, and/or other associated hardware components, for both processing AV traffic, such as audio streams, video streams, etc., and for processing non-AV traffic. For example, the host processor may receive AV traffic, decrypt the AV traffic and/or add encryption to the AV traffic, and forward the AV traffic to a computing device operably connected to the gateway device, for example, via a local area network. In addition to performing these actions, the host processor may also process non-AV traffic that is transmitted over the local area network. Accordingly the host processor may negotiate multiple incoming and outgoing network connections, including determining whether traffic transmitted via each network connection should be encrypted or decrypted, encrypting and/or decrypting AV traffic, switching and/or responding to non-AV traffic, and tearing down each network connection when the network connection has been terminated. Furthermore, the host processor may process the traffic uniformly, for example, in the same manner, irrespective of whether the traffic is AV traffic or non-AV traffic.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for decoupling AV traffic processing from non-AV traffic processing, a gateway device includes a dedicated processor along with associated hardware and/or firmware that exclusively processes AV traffic transmitted through the gateway device. In one or more implementations, the dedicated processor and associated hardware and/or firmware may collectively be referred to as an AV stream processor, an advanced stream processor (ASP), and/or a stream processor. The gateway device may further include a general purpose host processor that processes non-AV traffic transmitted through the gateway device. The host processor can program a network switch to forward AV traffic associated with a network connection to the AV stream processor for processing, and to forward non-AV traffic to the host processor for processing. Thus, the subject technology allows AV traffic processing to be decoupled from non-AV traffic processing in a gateway device. Accordingly, the AV stream processor of the gateway device may be specifically configured to process AV traffic, for example, based on one or more attributes and/or characteristics of AV traffic, which may provide for more efficient processing of AV traffic than may be achievable by the host processor, and may thereby reduce the latency associated therewith. Furthermore, offloading AV traffic processing to the AV stream processor may reduce the traffic processing burden on the host processor.

Figure 1:
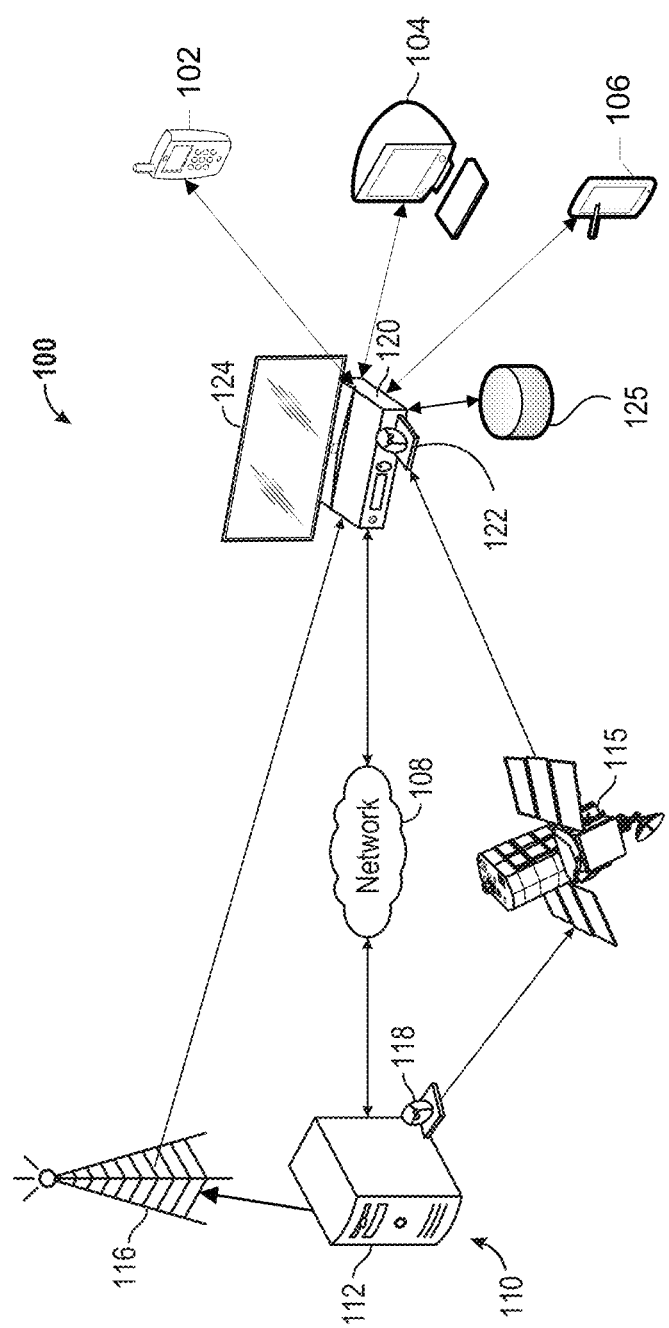
FIG. 1 illustrates an example network environment in which a system for decoupling AV traffic processing from non-AV traffic processing may be implemented in accordance with one or more implementations.

FIG. 1 illustrates an example network environment 100 in which a system for decoupling AV traffic processing from non-AV traffic processing may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

Example network environment 100 includes content delivery network (CDN) 110, including AV server 112, and that is communicably coupled to gateway device 120, such as by network 108. Example network environment 100 further includes one or more electronic devices 102, 104, 106 that are communicably coupled to gateway device 120, such as via a local area network (LAN). The LAN may be realized by any one of multiple technologies including, for example, Ethernet, WiFi, multimedia over coax alliance (MoCA), HomePlug® power line communications, and/or the like. CDN 110, gateway device 120, and/or any of electronic devices 102, 104, 106, may be, or may include, one or more components of the electronic system discussed below with respect to FIG. 8. In one or more implementations, gateway device 120 may be, or may also include, a set-top box, for example, a device that is coupled to, and is capable of presenting AV programs on, an output device 124, such as a television, a monitor, speakers, or any device capable of presenting AV programs. In one or more implementations, gateway device 120 may be integrated into output device 124. Gateway device 120 may be, for example, a digital subscriber line (DSL) gateway, a cable modem gateway, or generally any gateway device.

CDN 110 may include, and/or may be communicably coupled to, an AV server 112, an antenna 116 for transmitting AV streams, such as via multiplexed bitstreams, over the air, and satellite transmitting device 118 that transmits AV streams, such as via multiplexed bitstreams to satellite 115. Gateway device 120 may include, and/or may be coupled to, satellite receiving device 122, such as a satellite dish, that receives data streams, such as multiplexed bitstreams, from satellite 115. In one or more implementations, gateway device 120 may further include an antenna for receiving data streams, such as multiplexed bitstreams over the air from antenna 116 of CDN 110. In one or more implementations, AV server 112 may transmit AV streams to gateway device 120 over the coaxial transmission network. In one or more implementations, gateway device 120 may receive internet protocol (IP) distribution via only one of antenna 116 (e.g., in a cellular network or other similar wireless network), satellite 115, or network 108.

Network 108 may be a WAN, LAN, or any other network consisting of one or multiple networking technologies (such as satellite, cellular, cable, DSL, passive optical network (PON), Ethernet over twisted pairs, and others), and which deploys one or multiple networking protocols for transferring AV data. Network 108 may also include, but is not limited to, any one or more of the following network topologies, including a bus network, a star network, a ring network, a mesh network, a star-bus network, a tree or hierarchical network, and the like.

AV server 112 may transmit data transmissions that include AV content items, such as television programs, movies, or generally any multimedia content, via network 108. For example, AV server 112 may transmit Internet Protocol (IP) streams, such as unicast or multicast streams that include content items over network 108. In one or more implementations, any data transmissions that include AV streams and/or AV data, and/or are associated with AV streams and/or AV data, may be referred to as AV traffic (or AV network traffic). In one or more implementations, any of the AV streams transmitted by AV server 112 may be, or may include, a transport stream that contains transport stream packets, such as an MPEG transport stream.

AV server 112 may include, or may be coupled to, one or more processing devices and/or a data store. The one or more processing devices execute computer instructions stored in the data store, for example, to transmit AV traffic. The data store may store the computer instructions on a non-transitory computer-readable medium. The data store may further store one or more content items that are transmitted by AV server 112. In one or more implementations, AV server 112 may be a single computing device such as a computer server. Alternatively, AV server 112 may represent multiple computing devices that are working together to perform the actions of a server computer (such as a cloud of computers and/or a distributed system). AV server 112 may be coupled with various databases, storage services, or other computing devices, that may be collocated with AV server 112 or may be disparately located from AV server 112.

Electronic devices 102, 104 and 106 can be computing devices such as laptop or desktop computers, smartphones, portable media players, set-top boxes, tablet computers, televisions or other displays with one or more processors coupled thereto and/or embedded therein, or other appropriate computing devices that can be used for adaptive bit rate streaming, and rendering, of multimedia content and/or can be coupled to such a device. In the example of FIG. 1, electronic device 102 is depicted as a smart phone, electronic device 104 is depicted as a desktop computer, and electronic device 106 is depicted as a tablet device. Electronic device may be coupled to, and/or is capable of presenting AV programs on, an output device 124, such as a television, a monitor, speakers, or any device capable of presenting AV programs. In one or more implementations, any of electronic devices 102, 104, 106 may be referred to as a user device or a client device.

Gateway device 120 may be configured to couple electronic devices 102, 104, 106 to AV server 112 and/or to network 108. For example, gateway device 120 may receive requests for AV streams from electronic devices 102, 104, 106 and may forward the requests to AV server 112. In response to the requests, gateway device 120 may receive AV traffic from AV server 112 and may forward the AV traffic to one or more of electronic devices 102, 104, 106. In one or more implementations, gateway device 120 may be connected to storage device 125 (for example, a hard drive) for transfer and/or storage of files and/or AV programs. Gateway device 120 may be connected to storage device 125 via any interface, including USB, SATA, eSATA, or the like. In one or more implementations, gateway device 120 may be, or may include, a set-top box, for example, a device that can be coupled to a display, such as a television, and is capable of providing multimedia content for presentation on the display. In one or more implementations, gateway device 120 may receive and/or retrieve AV data via one or more other connections (aside from network 108), such as via a coaxial connection, via an over-the-air antenna connection, via a satellite connection, via a local hard drive connection, and the like. Gateway device 120 may process the received and/or retrieved AV data, for example, by decrypting, encrypting, transcoding, and/or packetizing the AV data, and may forward the processed AV data to one or more of electronic devices 102, 104, 106.

Gateway device 120 may include a host processor for processing non-AV traffic and a dedicated processor, along with associated hardware/firmware, that exclusively processes AV traffic, for example, an AV stream processor. In one or more implementations, gateway device 120 may include a network switch device that can be configured to switch non-AV traffic to the host processor and AV traffic to the AV stream processor. Thus, in gateway device 120, AV traffic processing by the AV stream processor is decoupled from non-AV traffic processing by the host processor. An example gateway device 120 implementing the subject system, and an example operation thereof, are discussed further below with respect to FIGS. 2-7, respectively.

Figure 2:
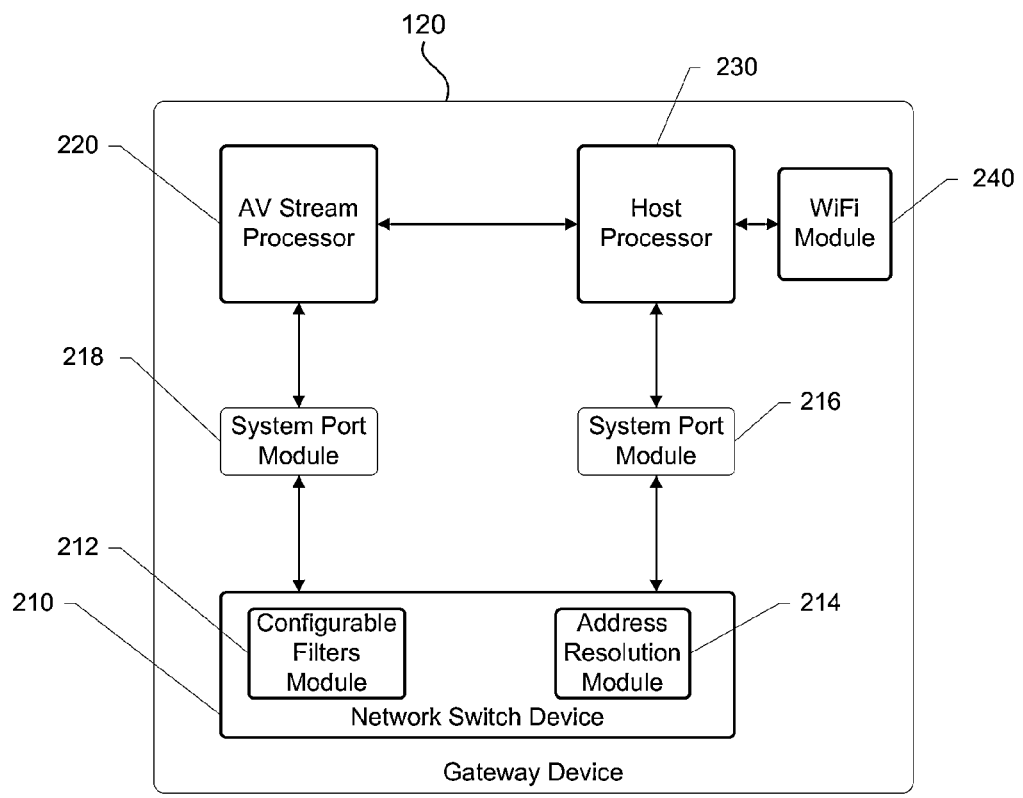
FIG. 2 illustrates an example gateway device implementing an example system for decoupling AV traffic processing from non-AV traffic processing in accordance with one or more implementations.

FIG. 2 illustrates an example gateway device 120 implementing an example system for decoupling AV traffic processing from non-AV traffic processing in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

Gateway device 120 includes network switch device 210, system port module 216, AV stream processor 220, host processor 230, and WiFi module 240. Network switch device 210 may include configurable filters module 212 and address resolution module 214. Configurable filters module 212 may include one or more configurable filters for filtering and/or switching network traffic at network switch device 210. Address resolution module 214 may include one or more tables for resolving addresses of components of gateway device 120.

In one or more implementations, gateway device 120 may operate in an example subscriber data network and may connect to one or more electronic devices 102, 104, 106. In one or more implementations, gateway device 120 may include non-volatile storage device 125, such as a hard drive, (for example, in a set-top box/unit) that may store AV data from an active AV stream. Accordingly, gateway device 120 and/or storage device 125 may be a source of AV data, for example, by retrieving the stored AV data at gateway device 120 from storage device 125, processing the AV data, and providing the AV data to one or more electronic devices 102, 104, 106, In one or more implementations, gateway device 120 may be implemented as a set top box configured to connect to the subscriber network and to receive and/or display AV data.

AV stream processor 220 may include one or more processors, memory, such as DRAM, and one or more other modules and/or associated circuitry for processing AV traffic, such as a packetizer module, a depacketizer module, a transcoder module, one or more security modules, and the like. Host processor 230 may be a general purpose processor of gateway device 120. Host processor 230 and AV stream processor 220 may be communicatively coupled to one another, for example, via a system bus, a mailbox in DRAM, and the like. System port module 216 may include suitable logic and/or circuitry for interfacing host processor 230 with network switch device 210. AV stream processor 220 may also include a system port module 218 (for example, embedded within AV stream processor 220) for interfacing AV stream processor 220 with network switch device 210. WiFi module 240 may be integrated within the same system on-chip as AV stream processor 220 and/or include one or more interfaces for communicating with host processor 230, such as a peripheral component interconnect express (PCIe) interface, universal serial bus (USB), Reduced Gigabit Media Independent Interface (RGMII), or the like, and may be configured to wirelessly couple one more devices, such as one or more of electronic devices 102, 104, 106, and/or AV server 112, to gateway device 120. Network switch device 210 may include suitable circuitry and/or logic for switching network traffic, such as AV traffic and non-AV traffic, to or from one or more components of gateway device 120, such as host processor 230 and/or AV stream processor 220.

In this regard, host processor 230 and/or AV stream processor 220 may individually be associated with a port on network switch device 210. For example, AV stream processor 220 may be associated with, and accessed via, for example port 4, or any other port, and host processor 230 may be associated with, and accessed via, for example port 8, or any port that is distinct from the port associated with AV stream processor 220. Network switch device 210 may be configured to switch packets received from, and/or transmitted to, an operably connected device, such as one or more of electronic devices 102, 104, 106 and/or AV server 112, to either port and consequently to either of AV stream processor 220 or host processor 230. In one or more implementations, network traffic originating from AV server 112 may not be initially directed to and/or switched by network switch device 210, but instead processed first by host processor 230 (which may implement network address translation) and then inserted and switched and/or routed by network switch device 210.

In one or more implementations, host processor 230 may configure network switch device 210 to dynamically switch network traffic matching certain network criteria to one or more ports, such as a port associated with host processor 230 and/or a port associated with AV stream processor 220. In this regard, network switch device 210 may include an address resolution module 214 that includes address resolution tables for resolving addresses of devices attached to its ports (and/or internal component addresses of gateway device 120), and configurable filters module 212 for configuring network criteria for switching network traffic. Network switch device 210 may initially be configured to forward network packets, for example, network packets corresponding to AV traffic and non-AV traffic, to host processor 230 via a port associated with host processor 230. Host processor 230 may be configured to setup and teardown network connections using a socket API (for example, using Berkley (BSD) network sockets and/or Linux networking stack).

In this regard, network switch device 210 may switch requests to establish network connections to host processor 230 via system port module 216. Host processor 230 may establish the network connections and then determine whether AV traffic will be transmitted over the network connections. If host processor 230 determines that AV traffic will be transmitted over a network connection, host processor 230 transfers the network connection to AV stream processor 220 and configures network switch device 210 to switch the AV traffic for the network connection to AV stream processor 220, for example, by programming configurable filters module 212 of network switch device 210. When the transmission of the AV traffic has completed, and the network connection is ready to be closed, AV stream processor 220 transfers the network connection back to host processor 230 for teardown. The transferring of network connections between host processor 230 and AV stream processor 220 is discussed further below with respect to FIGS. 3-5.

Figure 3A:
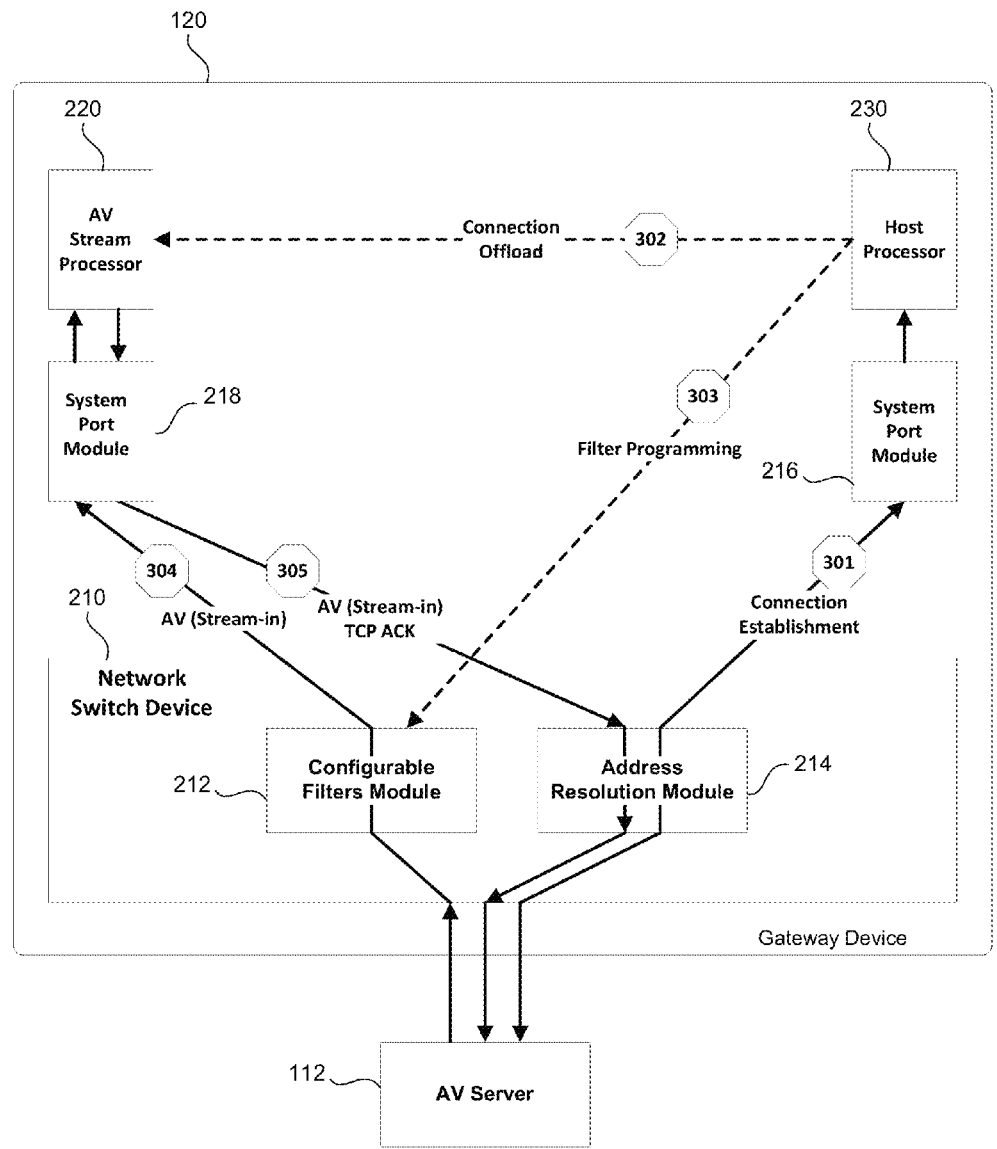
FIGS. 3A and 3B illustrate first and second example data flows through a system for decoupling AV traffic processing from non-AV traffic processing in accordance with one or more implementations.
Figure 3B:
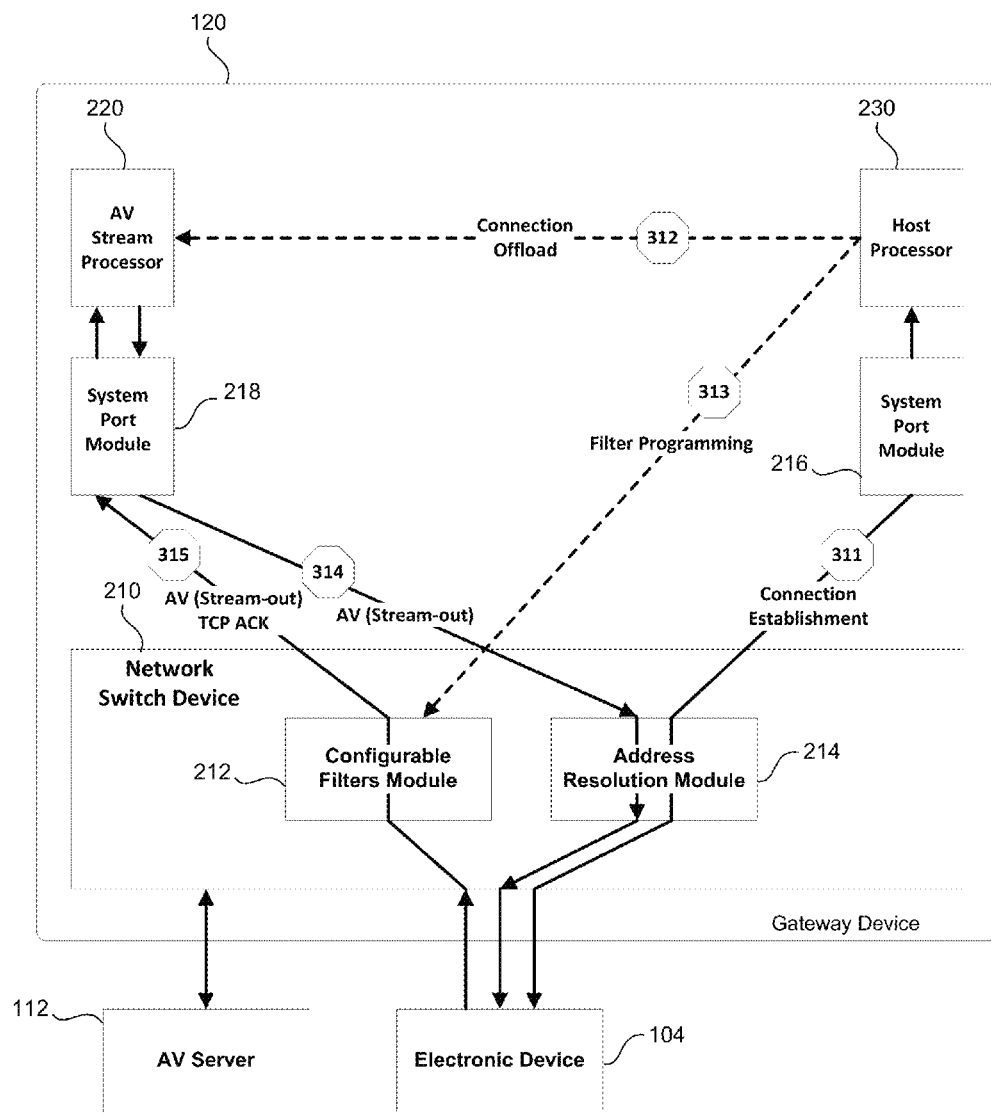

FIGS. 3A and 3B illustrate first and second example data flows through a system for decoupling AV traffic processing from non-AV traffic processing in accordance with one or more implementations. Not all of the depicted components in FIGS. 3A and 3B may be required, however, and one or more implementations may include additional components not shown in the figure. Variations in the arrangement and type of the components may be made without departing from the spirit or scope of the claims as set forth. For explanatory purposes, the steps of the example data flows are described herein as occurring in serial, or linearly. However, multiple steps of the example data flows may occur in parallel. In addition, the steps of the example data flows need not be performed in the order shown and/or one or more of the steps of the example data flows need not be performed.

With regard to FIG. 3A, AV stream processor 220 receives AV traffic, for example, a requested AV stream, from a device external to gateway device 120, for example, from AV server 112. For example, AV server 112 establishes a network connection with host processor 230, for example, through system port module 216 (301). In operation, when host processor 230 receives a connection request, host processor 230 facilitates establishing the network connection, including handshaking and negotiation of a network session (identified, for example, by an address and port number) with the external device according to the corresponding network protocol. In one or more implementations, system port module 216 may interface host processor 230 with network switch device 210, and the connection may be established via communications through system port module 216. After the network connection has been established, host processor 230 performs an inspection of data packets associated with the network connection to determine whether the network connection is associated with, and/or includes, AV data. If host processor 230 determines that the network connection is associated with, and/or includes, AV data, then host processor 230 offloads the network connection, and/or a network session associated therewith, to AV stream processor 220 (302).

As part of the offload process, in one or more implementations, host processor 230 may leverage network protocol migration APIs (for example, TCP container migration APIs, such as Linux-based TCP container migration APIs) to retrieve the connection state from the network stack and provide the state to AV stream processor 220. Host processor 230 may also configure a list of rules that specify how to handle incoming packets. Any packets received before offloading of the network connection is complete may be temporarily stored and/or handled according to these rules. The lists of rules may be implemented, for example, as a series of specialized tables (for example, Linux iptables).

After or in connection with offloading the network connection, host processor 230 configures network switch device 210 to switch incoming packets of the offloaded network connection to AV stream processor 220 (303). Once the network connection has been offloaded and network switch device 210 configured, AV stream processor 220 receives AV traffic, for example, an AV stream, from AV server 112 via network switch device 210 (304). In one or more implementations, a system port module 218 may interface AV stream processor 220 with network switch device 210, and the AV traffic may be received by AV stream processor 220 via system port module 218. In response to receiving the AV traffic, AV stream processor 220 may transmit one or more TCP acknowledgements to AV server 112 via network switch device 210 (305).

With regard to FIG. 3B, AV stream processor 220 transmits AV traffic, for example, a requested AV stream, to a device external to gateway device 120, for example, to electronic device 104. In one or more implementations, the transmitted AV traffic may originate from a local hard drive or an already established connection with AV server 112. In one or more implementations, AV traffic may have been previously offloaded from AV server 112 and/or, for example, stored on the local hard drive.

Electronic device 104 establishes a network connection with host processor 230, for example, through system port module 216 (311). Host processor 230 determines that the network connection is associated with, and/or includes, a request for AV traffic, and offloads the network connection, and/or a network session associated therewith, to AV stream processor 220 (312). Host processor 230 then configures network switch device 210 to switch incoming packets of the offloaded network connection to AV stream processor 220 (313). As described previously, network switch device 210 may be configured, for example, by setting one or more rules in configurable filters module 212. Once the network connection has been offloaded and network switch device 210 configured, AV stream processor 220 transmits AV traffic, for example, an AV stream, to electronic device 104, via network switch device 210 (314). In the depicted example, one or more TCP acknowledgements are received by AV stream processor 220, for example, from electronic device 104 via network switch device 210 to indicate that data was received by electronic device 104 (315).

Figure 4A:
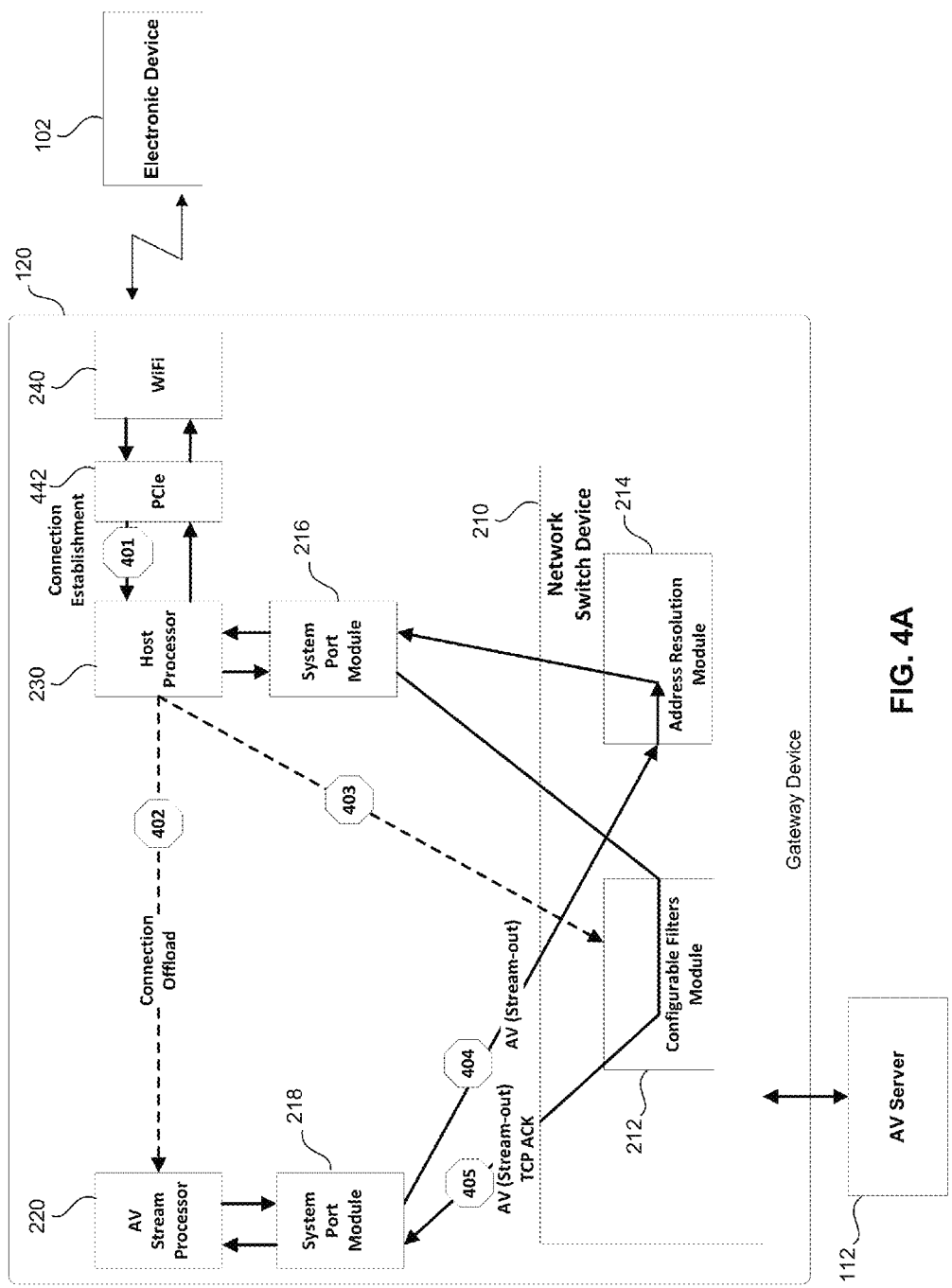
FIGS. 4A and 4B illustrate third and fourth example data flows through an example system for decoupling AV traffic processing from non-AV traffic processing in accordance with one or more implementations.
Figure 4B:
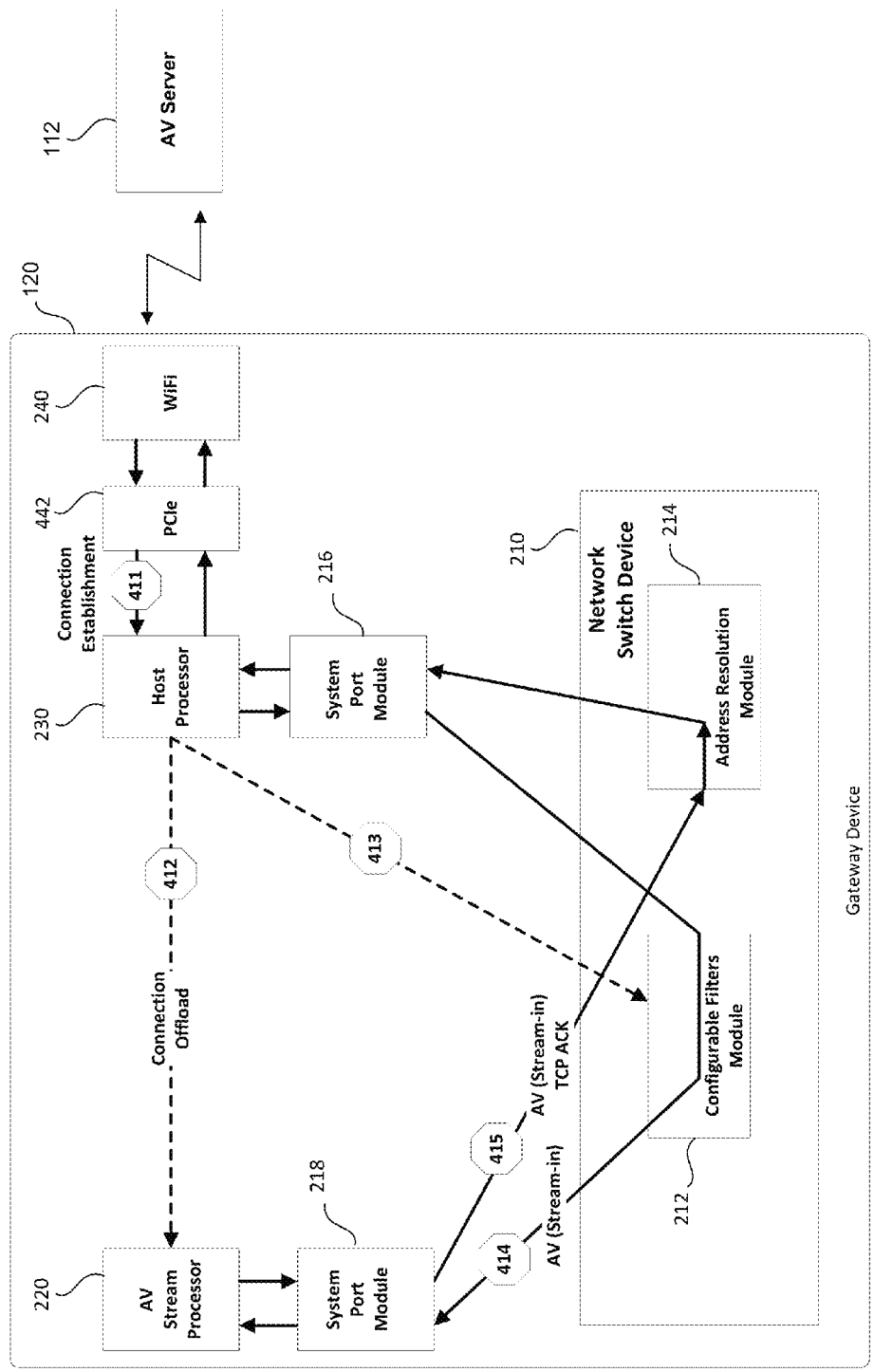

FIGS. 4A and 4B illustrate third and fourth example data flows through an example system for decoupling AV traffic processing from non-AV traffic processing in accordance with one or more implementations. Not all of the depicted components in FIGS. 4A and 4B may be required, however, and one or more implementations may include additional components not shown in the figure. Variations in the arrangement and type of the components may be made without departing from the spirit or scope of the claims as set forth. For example, WiFi module 240 is depicted as a separate component that interfaces with host processor 230 of gateway device 120 via a PCIe interface 442. In this regard, WiFi module 240 may also be implemented in an off-chip configuration in which the other depicted components of gateway device 120 are implemented as a single chip (e.g., in a set top box chip) that interfaces with WiFi module 240. In some implementations, however, gateway device 120 may include multiple components and/or chips, including, for example, WiFi module 240. For explanatory purposes, the steps of the example data flows are described herein as occurring in serial, or linearly. However, multiple steps of the example data flows may occur in parallel. In addition, the steps of the example data flows need not be performed in the order shown and/or one or more of the steps of the example data flows need not be performed.

With regard to FIG. 4A, AV stream processor 220 transmits AV traffic, for example, a requested AV stream, to a device external to gateway device 120, for example, to electronic device 102 via WiFi module 240. In one or more implementations, the transmitted AV traffic may originate from a local hard drive or an already established connection with AV server 112. For example, electronic device 102 may be operably connected to WiFi module 240 for receiving AV traffic from AV stream processor 220. A network connection is established between host processor 230 and electronic device 102 (401). In one or more implementations, PCIe interface 442 may interface WiFi module 240 with host processor 230, and the connection may be established via communications through PCIe interface 442. Host processor 230 determines that the network connection is associated with, and/or includes, AV traffic, and offloads the network connection, and/or a network session associated therewith, to AV stream processor 220 (402). Host processor 230 then configures network switch device 210 to switch incoming packets of the offloaded network connection (provided to network switch device 210 by host processor 230) to AV stream processor 220, and to switch outgoing packets from AV stream processor 220 to host processor 230 for delivery to WiFi module 240 (403). As described previously, network switch device 210 may be configured, for example, by setting one or more rules in configurable filters module 212.

Once the network connection has been offloaded, AV stream processor 220 transmits AV traffic, for example, an AV stream, through network switch device 210 and to host processor 230, where it is provided to WiFi module 240 for delivery to the operably connected electronic device 102 (404). In the depicted example, one or more TCP acknowledgements are received by AV stream processor 220, for example, from WiFi module 240 and/or electronic device 102 to indicate that the AV traffic was received (405).

With regard to FIG. 4B, AV stream processor 220 receives AV traffic, for example, a requested AV stream, from a device external to gateway device 120, for example, from AV server 112 via WiFi module 240. A network connection is established between host processor 230 and AV server 112 (411). Host processor 230 determines that the network connection is associated with, and/or includes, AV traffic, and offloads the network connection, and/or a network session associated therewith, to AV stream processor 220 (412). Host processor 230 then configures network switch device 210 to switch incoming packets of the offloaded network connection (provided to network switch device 210 by host processor 230) to AV stream processor 220, and to switch outgoing packets from AV stream processor 220 to host processor 230 for delivery to WiFi module 240 (413).

Once the network connection has been offloaded and network switch device 210 configured, AV stream processor 220 receives AV traffic originating from AV server 112, for example, an AV stream, via WiFi module 240 and through host processor 230 and network switch device 210 (414). In the depicted example, one or more TCP acknowledgements are provided by AV stream processor 220, for example, to WiFi module 240 and/or AV server 112 to indicate that the AV traffic was received by AV stream processor 220 (415).

One or more of the above example data flows of FIGS. 3A, 3B, 4A, and 4B may be implemented by gateway device 120. Moreover, multiple of the data flows described in each of the above figures may be performed in combination with each other and/or performed concurrently. For example, gateway device 120 may be used to simultaneously stream out AV data while at the same time receiving AV data streams. The AV data may be streamed to and from one or multiple electronic devices 102, 104, and 106, including, for example, via WiFi module 240 and/or via a wired connection.

Figure 5:
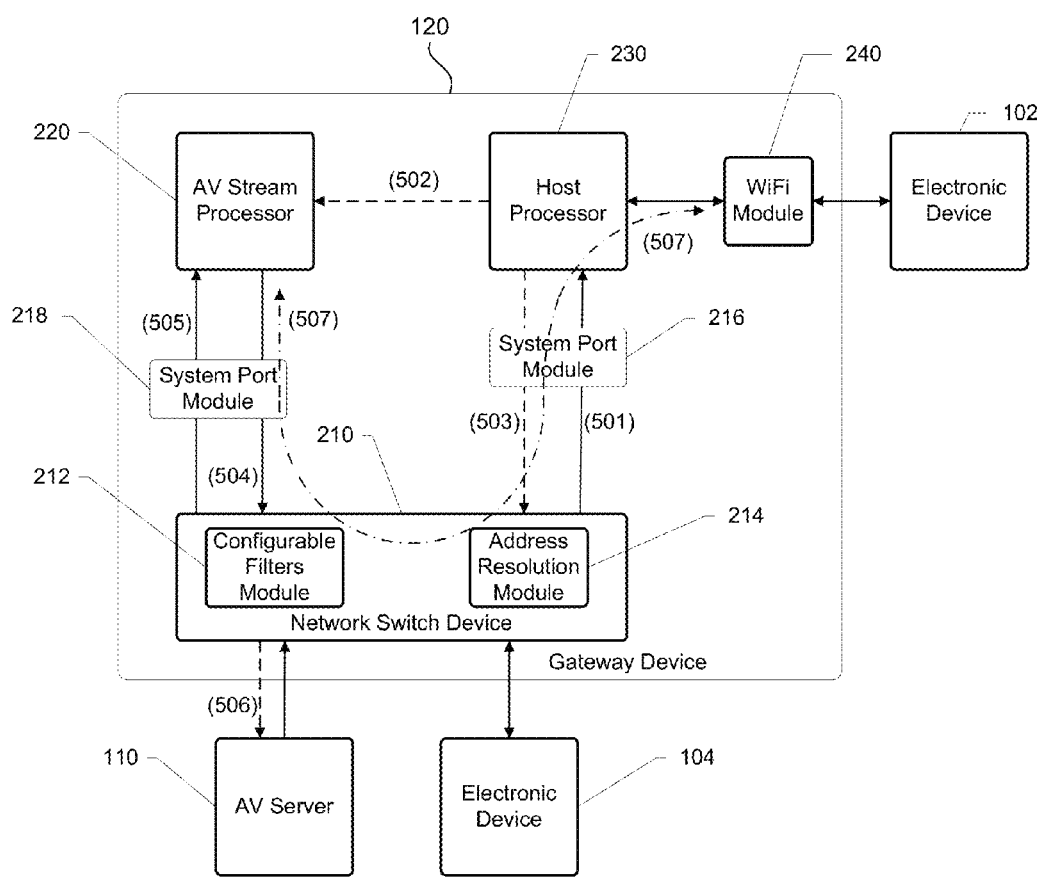
FIG. 5 illustrates an example gateway device, an example AV server, and example electronic devices implementing various data flows for decoupling AV traffic processing from non-AV traffic processing there through in accordance with one or more implementations.

FIG. 5 illustrates an example gateway device 120, an example AV server 112, and example electronic devices 102, 104 implementing various data flows for decoupling AV traffic processing from non-AV traffic processing in accordance with one or more implementations. Not all of the depicted components may be required, however, and one or more implementations may include additional components not shown in the figure. Variations in the arrangement and type of the components may be made without departing from the spirit or scope of the claims as set forth. For explanatory purposes, the steps of the example data flows are described herein as occurring in serial, or linearly. However, multiple steps of the example data flows may occur in parallel. In addition, the steps of the example data flows need not be performed in the order shown and/or one or more of the steps of the example data flows need not be performed.

In the depicted example, gateway device 120 includes host processor 230, network switch device 210, and AV stream processor 220, in accordance with one or more implementations of the subject technology. Gateway device 120 is communicatively coupled to AV server 112, for example, via network 108, and electronic device 104, for example, via a LAN.

In operation, when host processor 230 receives a connection request from, for example, electronic device 104, host processor 230 facilitates establishing a network connection, including handshaking and negotiation of a network session (identified, for example, by an address and port number) with electronic device 104 according to the corresponding network protocol (501). After a network connection has been established, host processor 230 performs an inspection of data packets associated with the network connection to determine whether the network connection is associated with, and/or includes, a request for AV data. If host processor 230 determines that the network connection is associated with, and/or includes, a request for AV data, then host processor 230 offloads the network connection, and/or a network session associated therewith, to AV stream processor 220, for example, before AV data is transmitted to electronic device 104 (502). As described previously, host processor 230 may leverage network protocol migration APIs to retrieve the connection state from the network stack and provide the state to AV stream processor 220. Host processor 230 may also configure a list of rules that specify how to handle incoming packets. Any packets received before offloading of the network connection is complete may be temporarily stored and/or handled according to these rules. The lists of rules may be implemented, for example, as a series of specialized tables (for example, Linux iptables).

In conjunction with offloading the network connection and/or network session, host processor 230 may configure network switch device 210 to switch incoming packets of the offloaded network connection to AV stream processor 220 (503). In one or more implementations, one or more predetermined rules for forwarding packets may be may be set in configurable filters module 212 to override regular forwarding in favor of policy based forwarding (based on, e.g., IP source/destination addresses, TCP/UDP source/destination ports, and protocol type (typically TCP or UDP). In one or more implementations, configurable filters module 212 may perform policy-based forwarding based on programmable and/or predetermined search keys that may be programmed, for example, by host processor 230 based on a determination that a network connection includes or is for transmission of AV data.

In one or more implementations, AV stream processor 220 transmits AV traffic, for example, a requested AV stream, to electronic device 104 (504) (for example, from a hard drive, from an already established connection with AV server 112, or from a connection to another content source which provides transport stream packets encapsulated within IP packets), via network switch device 210, for example, over the port associated with AV stream processor 220. In one or more implementations, native transport stream packets may be received and/or terminated by gateway device 120, converted (e.g., encapsulated) into IP packets, for example by AV stream processor 220, and then transferred by gateway device 120 to electronic device 104. In response to the AV traffic, electronic device 104 may transmit one or more TCP acknowledgements to network switch device 210, and network switch device 210 may forward the TCP acknowledgements to AV stream processor 220. In this manner, the AV traffic transmitted by AV stream processor 220, and acknowledgments thereof and/or other data transmitted by electronic device 104, are transmitted over the port of network switch device 210 that is associated with AV stream processor 220.

In one or more implementations, AV stream processor 220 may be configured to receive AV traffic and/or AV streams from AV server 112 (505), for example, after the initial network connection with AV server 112 is setup and offloaded in the previously described manner (for example, by host processor 230). In one or more implementations, network switch device 210 may be configured to direct communications between AV stream processor 220 and AV server 112 over the port associated with AV stream processor 220. For example, after the network connection has been established and offloaded to AV stream processor 220, AV stream processor 220 may receive AV traffic and/or AV streams from AV server 112 through the port associated with AV stream processor 220 (for example, while non-AV traffic is received by host processor 230 though the port associated with host processor 230). In one or more implementations, AV stream processor 220 may directly receive native transport streams, for example, when coupled to a satellite or cable distribution network that uses native MPEG transport streams.

When received by AV stream processor 220, AV traffic may be processed by AV stream processor 220, for example, depacketized, decrypted, encrypted, transcoded, packetized, etc., and provided to electronic device 104 through network switch device 210. The processed AV traffic may be sent by AV stream processor 220 to, for example, the associated port of network switch device 210 for transmission to electronic device 104.

In one or more implementations, AV server 112 and/or gateway device 120 may provide adaptive bit rate (ABR) streaming content over HTTP to electronic device 104. In this regard, AV data may be encoded into multiple streams, each segmented into small multi-second parts (for example, between two (2) and ten (10) seconds in length) and provided at a different data rate (for example, bit rate). AV server 112 and/or gateway device 120 may advertise the available media streams of differing data rates to electronic device 104, for example, by way of a source manifest file, including a stream profile for each source media stream and a playlist that describes the segments available from AV server 112. Accordingly, a network protocol request transmitted by electronic device 104 may be in the form of, for example, an HTTP Get request method for retrieving one or more segments of the AV data from AV server 112. For example, the request may include an HTTP uniform resource locator (URL) corresponding to one or more content segments of a media stream, with each request requesting transmission of a respective segment at a selected one of the ABR profiles indicated by the manifest file.

In connection with offloading the network connection to AV stream processor 220, host processor 230 provides the previously described network protocol request (for example, HTTP Get) for AV data to AV stream processor 220. AV stream processor 220 may then forward the request to AV server 112 (506). In other aspects, host processor 230 may forward the network protocol request to AV server 112, and AV stream processor 220 may receive the corresponding network protocol response (for example, HTTP Response) from AV server 112 when the network connection is offloaded. In one or more implementations, subsequent network requests and responses for an offloaded network connection may be handled by AV stream processor 220. In one or more implementations, host processor 230 may perform initial processing of each IP packet and AV stream processor 220 may perform encryption and/or decryption of the AV data therein.

In one or more implementations, AV stream processor 220 may process AV traffic transmitted between electronic device 104 and AV server 112, may receive AV traffic from AV server 112, and, in connection with network switch device 210 and internal components of gateway device 120, may provide AV data from AV server 112 to electronic device 104. In this regard, AV stream processor 220 is configured to receive subsequent network protocol requests from electronic device 104 for AV data (for example, segments of AV data), forward each request to AV server 112, receive the AV data from AV server 112 on behalf of electronic device 104, and forward the requested AV data to electronic device 104.

In one or more implementations, AV data may be transmitted over WiFi module 240 to, for example, electronic device 102. In one or more implementations, WiFi module 240 may be communicably attached to a port associated with network switch device 210. In one or more implementations, WiFi module 240 may not be associated with a port of network switch device 210. Accordingly, network traffic received through WiFi module 240 may not flow directly to network switch device 210, but may flow through an interface (for example, a PCIe interface) operably connected to host processor 230, and from host processor 230 to network switch device 210. Establishment and offloading of a network connection initiated through WiFi module 240 may be handled as described previously. However, network switch device 210 may be configured to switch AV traffic received from or transmitted to WiFi module 240 through AV stream processor 220 (507). In this respect, AV traffic transmitted from AV stream processor 220 to electronic device 102 connected via WiFi module 240, such as AV traffic received from AV server 112, may flow through the port of network switch device 210 that is associated with AV stream processor 220, and the port of network switch device 210 that is associated with host processor 230. In one or more implementations, host processor 230 may be configured to bridge a connection via WiFi module 240 to a connection via network switch device 210, such as a MoCA connection, a LAN connection, etc.

AV stream processor 220 may be configured to monitor a network connection to determine when the network connection should be terminated. For example, on receiving an indication that the network connection should be terminated (for example, on receiving an EOF (end of file), stream tear-down request, or other channel change event), AV stream processor 220 signals host processor 230, and/or a component executing thereon and/or in communication therewith, that the network connection should be terminated. Accordingly, host processor 230 leverages network protocol migration APIs to recreate the network state on the network stack used by host processor 230 and hands the network connection and/or network session back over to host processor 230. Accordingly, host processor 230 may then instruct the network stack to initiate tear-down of the network connection, including closing the corresponding network sockets.

Figure 6:
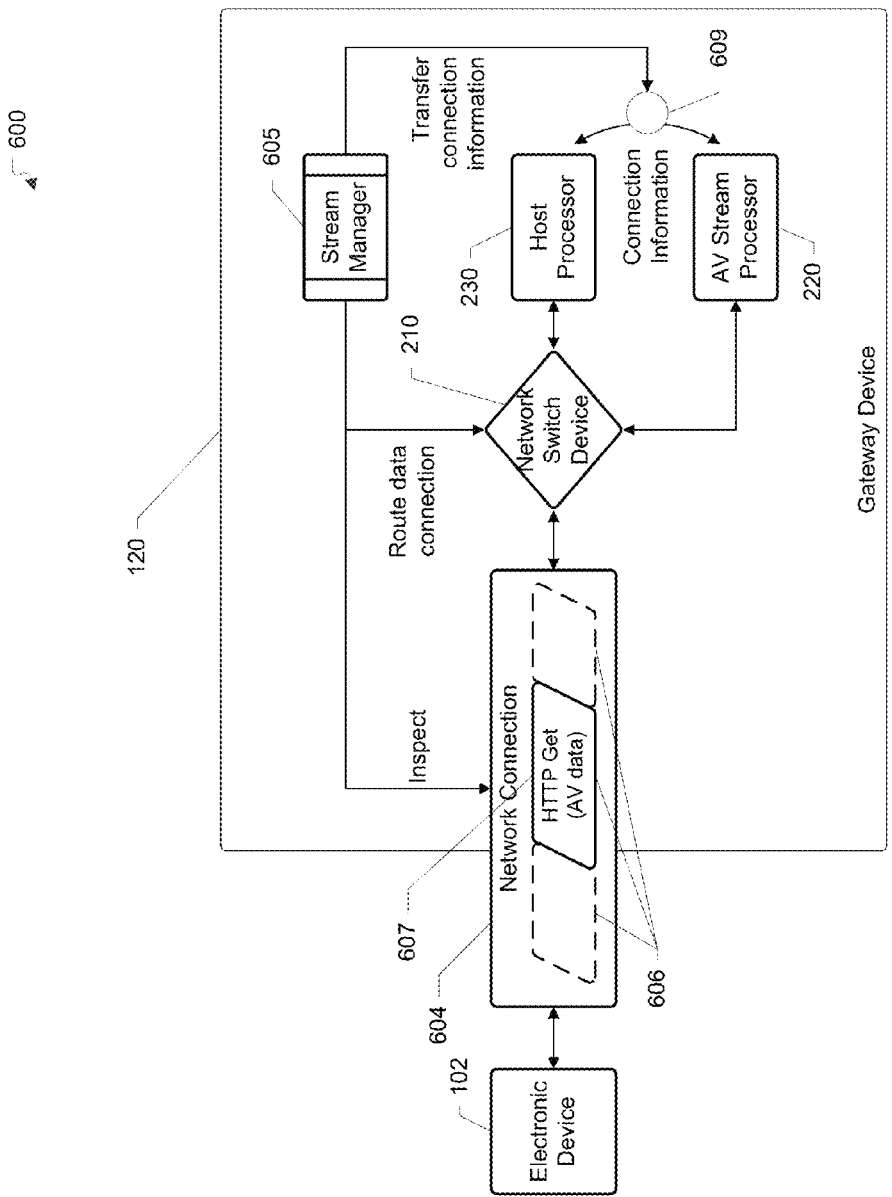
FIG. 6 illustrates a component communication and interaction diagram of an example system for decoupling AV traffic processing from non-AV traffic processing, in accordance with one or more implementations.

FIG. 6 illustrates a component communication and interaction diagram 600 of an example system for decoupling AV traffic processing from non-AV traffic processing, in accordance with one or more implementations. Not all of the depicted components may be required, however, and one or more implementations may include additional components not shown in the figure. Variations in the arrangement and type of the components may be made without departing from the spirit or scope of the claims as set forth.

Component communication and interaction diagram 600 includes electronic device 102, gateway device 120, and network connection 604 that is being established between electronic device 102 and gateway device 120. In component communication and interaction diagram 600, gateway device 120 conceptually includes network switch device 210, AV stream processor 220, host processor 230, stream manager 605 that may illustrate a process executing on, for example, host processor 230, and/or one or more hardware components that operate in conjunction with host processor 230, and network connection information 609 that is transferred between host processor 230 and AV stream processor 220.

In operation, a network connection request may be received from electronic device 102, and the request may be switched by network switch device 210 to host processor 230 for processing. During or after the establishment of network connection 604, for example, in response to the network connection request, stream manager 605 performs an inspection of data packets 606 associated with network connection 604 (for example, packet inspection) to determine whether network connection 604 corresponds to AV network traffic. Stream manager 605 may inspect data packets 606 to determine whether data packets 606 include network protocol request 607 that is representative of and/or indicative of AV network traffic. Network protocol request 607 may be in the form of an HTTP request message (for example, HTTP Get, HTTP Post, or the like) received from electronic device 102, and may include a URL for retrieving an AV stream, one or more content segments of an AV stream, or any other AV data, such as from gateway device 120 and/or from a server known to provide AV data.

On determining that the network connection request (or related packet) corresponds to AV network traffic, stream manager 605 queries AV stream processor 220 to determine whether AV stream processor 220 has an open channel available for processing AV network traffic. Once an open channel is identified, stream manager 605 transfers network connection 604 (or packet in the case of a connectionless stream such as UDP), and network connection information 609, from host processor 230 to AV stream processor 220, or a component thereof. Such transfer may be accompanied with configuring network switch device 210 to forward data packets 606 for network connection 604 to AV stream processor 220 instead of host processor 230.

In one or more implementations, network switch device 210 includes one or more configurable filters for separating network traffic received by network switch device 210, for example, configurable filters module 212 of FIGS. 2-5. In this regard, stream manager 605 may dynamically program one or more configurable filters of network switch device 210 to switch AV traffic for network connection 604 to a port of network switch device 210 that is associated with AV stream processor 220, instead of a port associated with host processor 230. Behind network switch device 210, stream manager 605 transfers network connection information 609 for network connection 604 from host processor 230 to AV stream processor 220 so that AV stream processor 220 may begin direct communication with electronic device 102 via the port of network switch device 210 that is associated with AV stream processor 220. In one or more implementations, AV stream processor 220 uses the same MAC address as host processor 230, thereby disguising itself as host processor 230 to external devices, such as electronic device 102.

Figure 7:
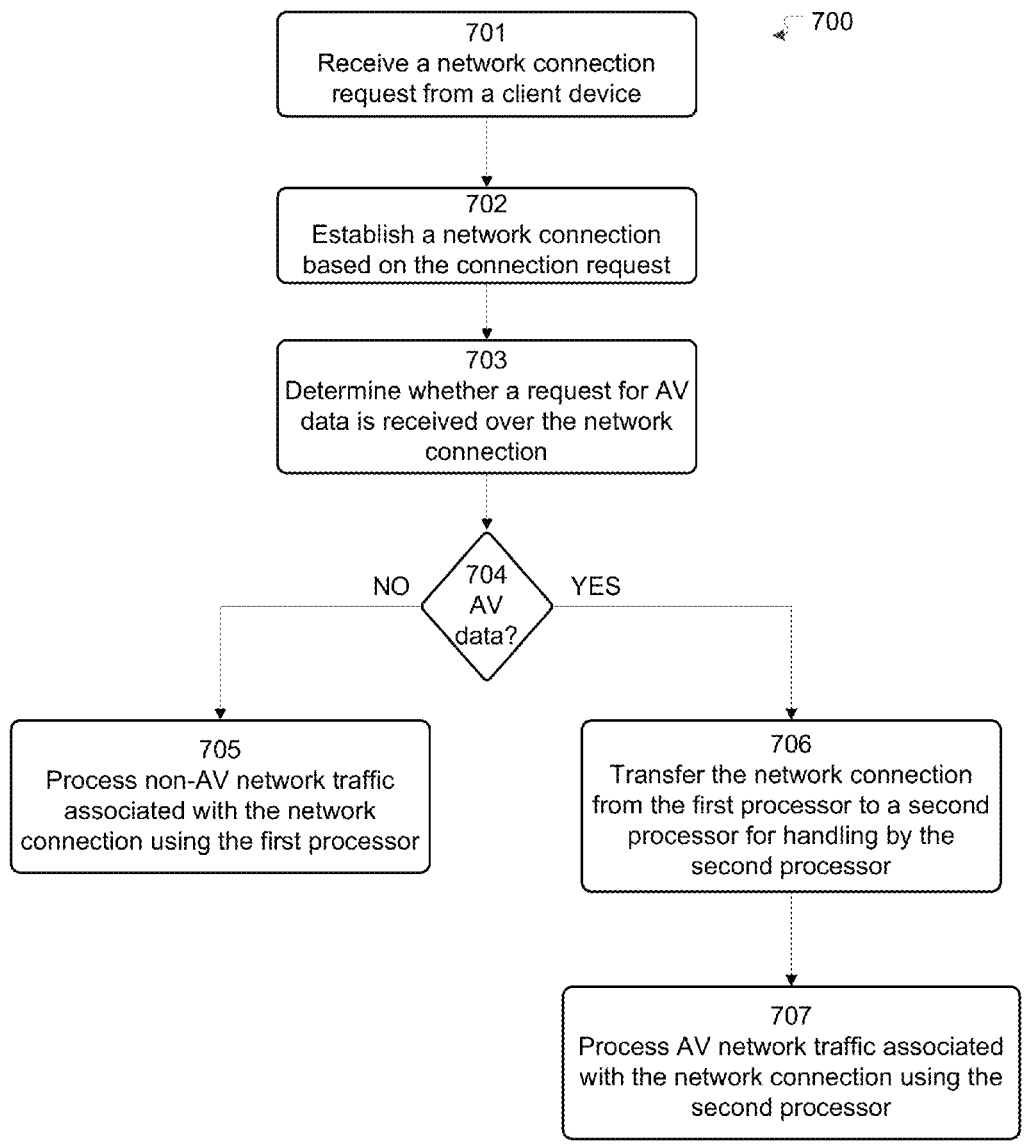
FIG. 7 illustrates a flow diagram of an example process for decoupling AV traffic processing from non-AV traffic processing in accordance with one or more implementations.

FIG. 7 illustrates a flow diagram of an example process 700 for decoupling AV traffic processing from non-AV traffic processing in accordance with one or more implementations. Although FIG. 7 is related to decoupling AV traffic processing from non-AV traffic processing it is understood that example process 700 may be related to and/or used for any data flow requiring special treatment of latency, or for providing higher bit rate support and/or processor optimizations. For example, host processor 230 may implement the same or similar process and/or related mechanism to offload a file transfer, or for bridging WiFi traffic, from host processor 230 to a different processor, for example, not limited to AV stream processor 220.

For explanatory purposes, example process 700 is described herein with reference to components of gateway device 120 of FIGS. 1-6; however, example process 700 is not limited to gateway device 120 of FIGS. 1-6, and example process 700 may be performed by one or more other components of gateway device 120. Further for explanatory purposes, the blocks of example process 700 are described herein as occurring in serial, or linearly. However, multiple blocks of example process 700 may occur in parallel. In addition, the blocks of example process 700 need not be performed in the order shown and/or one or more of the blocks of example process 700 need not be performed. In one or more implementations, a non-transitory machine-readable medium may include machine-executable instructions thereon that, when executed by a computer or machine, perform example process 700. Accordingly, example process 700 may be performed by a streaming media system including, for example, one or more components of a set top box or gateway device, within the context of processing and/or providing AV data to a client device, such as electronic device 102.

Network switch device 210 of gateway device 120 receives a network connection request (701), for example, from electronic device 102, and forwards the network connection request to a first processor, such as host processor 230. In one or more implementations, gateway device 120 may include a module, such as system port module 216, to facilitate communications between host processor 230 and network switch device 210. The first processor, such as host processor 230, establishes network connection 604 based on the connection request (702). In one or more implementations, the first processor includes and/or operates in conjunction with stream manager 605 for execution of various operations, including one or more of the operations of FIG. 7.

Upon establishing network connection 604, the first processor and/or a component thereof or in communication therewith, such as stream manager 605, determines whether a request for AV data is received over network connection 604 (703). For example, stream manager 605 may inspect network traffic associated with network connection 604 to determine whether the network traffic received over network connection 604 includes a network protocol request for AV data. As described previously, a network protocol request may be an HTTP request message including, for example, a URL for retrieving one or more content segments of an AV stream from AV server 112 and/or from gateway device 120.

If the first processor, such as host processor 230, determines that a request for AV data was not received over network connection 604 (704), non-AV traffic associated with network connection 604 is processed by the first processor, such as host processor 230 (705). Thus, if network connection 604 was not initiated for the purpose of receiving AV data and/or AV traffic, then the first processor, such as host processor 230, performs network processing for the non-AV traffic of network connection 604 without having to process any AV traffic.

If the first processor, such as host processor 230, determines that a request for AV data was received over network connection 604 (704), first processor transfers network connection 604, to the second processor, such as AV stream processor 220 (706). For example, the first processor and/or a component thereof or in communication therewith, such as stream manager 605, transfers network connection information 609, including the network connection state and/or network session information, from the first processor, such as host processor 230, to the second processor, such as AV stream processor 220. In conjunction therewith, the first processor and/or a component thereof, such as stream manager 605, may configure network switch device 210 to forward the AV traffic for network connection 604 to the second processor instead of the first processor.

In one or more implementations, network connection 604 includes a connection-oriented communication session between gateway device 120 and electronic device 102. Accordingly, a network session may be established before data may be transmitted. The network session may be based on application layers such as session initiation protocol (SIP), real time streaming protocol (RTSP), HTTP, and the like, in connection with transmission control protocol (TCP) or other transport layer protocol. Additionally or in the alternative, the network session may be based on User Datagram Protocol (UDP) and/or RTSP. For example, network connection 604 may be for a real-time streaming session (for example, an RTP session, or other session based on RTSP), with the AV network traffic including packets provided in connection with the real-time streaming session (for example, based on UDP).

Once network connection 604 has been transferred to the second processor, such as AV stream processor 220, and network switch device 210 has been configured to switch the AV traffic associated with network connection 604 to the second processor, the second processor may process the AV network traffic associated with network connection 604 (707). Thus, the second processor, such as AV stream processor 220, may be dedicated to handling AV traffic for network connection 604, such as by transmitting one or more response messages to electronic device 102 that include at least a portion of the requested (and processed) AV data. The second processor, such as AV stream processor 220, may process the AV traffic by, for example, framing the AV traffic, encrypting the AV traffic, decrypting the AV traffic, or the like. In one or more implementations, the second processor, such as AV stream processor 220, may process AV traffic substantially contemporaneous with the first processor, such as host processor 230, processing non-AV traffic.

Figure 8:
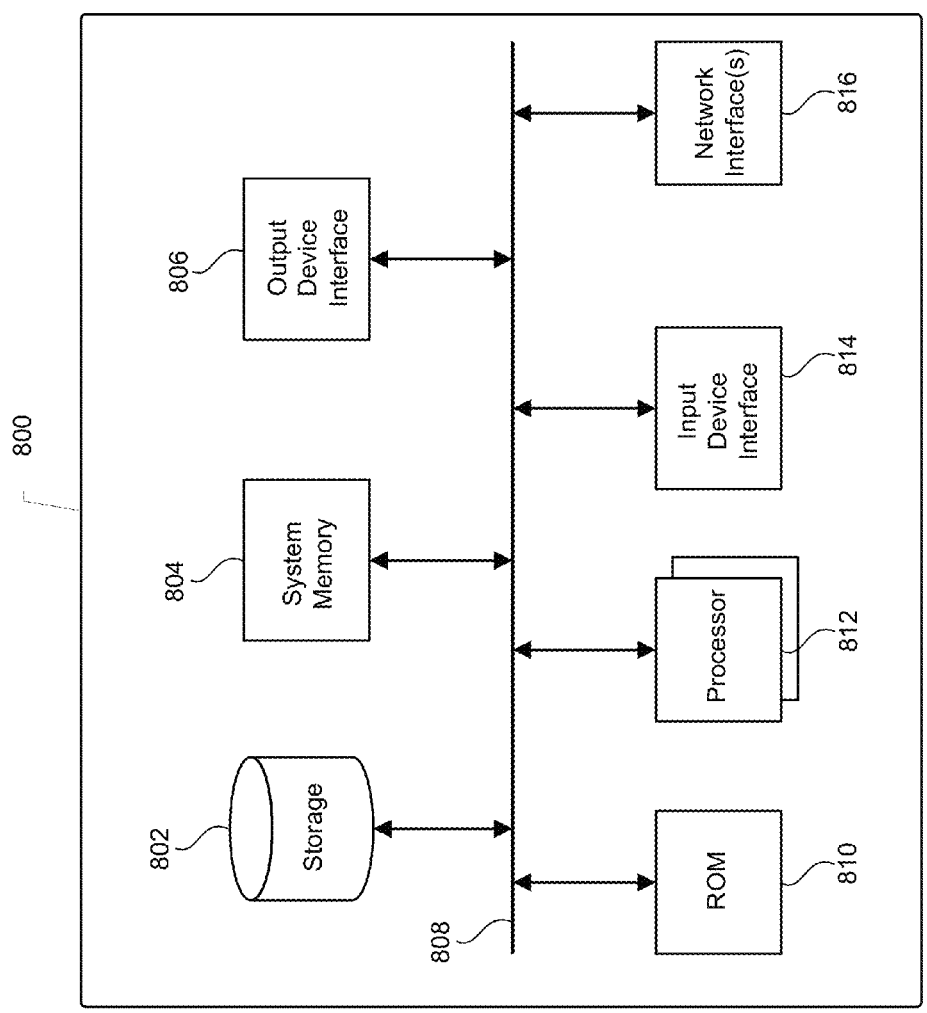
FIG. 8 illustrates an example electronic system with which one or more implementations of the subject technology may be implemented.

FIG. 8 illustrates an example electronic system 800 with which one or more implementations of the subject technology may be implemented. Electronic system 800, for example, is representative of the computing hardware embedded within, integrated with, or for providing functional operation of, the previously described systems and operations, including gateway device 120 and/or the blocks of FIG. 7. In one or more aspects, electronic system 800 may be a gateway device, a set-top box, a desktop computer, a laptop computer, a tablet computer, a server, a switch, a router, a base station, a receiver, a phone, or generally any electronic device that transmits signals over a network. Such an electronic system includes various types of computer readable media and interfaces for various other types of computer readable media. Electronic system 800 includes bus 808, one or more processing unit(s) 812, system memory 804, read-only memory (ROM) 810, permanent storage device 802, input device interface 814, output device interface 806, and one or more network interface(s) 816, or subsets and variations thereof.

Bus 808 may collectively represent all system, peripheral, and chipset buses that communicatively connect the numerous internal devices of electronic system 800. In one or more implementations, bus 808 communicatively connects one or more processing unit(s) 812 with ROM 810, system memory 804, and permanent storage device 802. From these various memory units, one or more processing unit(s) 812 may retrieve instructions to execute and data to process in order to execute the processes of the subject disclosure. One or more processing unit(s) 812 can be a single processor or a multi-core processor in different implementations.

ROM 810 stores static data and instructions that may be needed by one or more processing unit(s) 812 and/or other modules of electronic system 800. Permanent storage device 802, on the other hand, may be a read-and-write memory device. Permanent storage device 802 may be a non-volatile memory unit that stores instructions and data even when electronic system 800 is powered off. One or more implementations of the subject disclosure use a mass-storage device (such as a magnetic or optical disk and its corresponding disk drive) as permanent storage device 802.

One or more implementations may use a removable storage device (such as a floppy disk, flash drive, and its corresponding disk drive) as permanent storage device 802. Like permanent storage device 802, system memory 804 is a read-and-write memory device. However, unlike permanent storage device 802, system memory 804 is a volatile read-and-write memory, such as random access memory. System memory 804 stores any of the instructions and data that one or more processing unit(s) 812 may need at runtime. In one or more implementations, the processes of the subject disclosure may be stored in system memory 804, permanent storage device 802, and/or ROM 810. From these various memory units, the one or more processing unit(s) 812 may retrieve instructions to execute and data to process in order to execute the processes of one or more implementations.

Bus 808 may also connect to input and output device interfaces 814 and 806. Input device interface 814 may enable a user to communicate information and select commands to electronic system 800. The input devices used with input device interface 814 may include, for example, alphanumeric keyboards and pointing devices (also called "cursor control devices"). Output device interface 806 enables, for example, the display of images generated by electronic system 800. The output devices used with output device interface 806 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to a user or device can be any form of sensory feedback, such as visual feedback, auditory feedback, or tactile feedback; and input from the user or device can be received in any form, including acoustic, speech, or tactile input.

As shown in FIG. 8, bus 808 also couples electronic system 800 to one or more networks (not shown), one or more electronic devices 102, 104, 106, and/or AV server 112, through one or more network interface(s) 816. One or more network interface(s) may include an Ethernet interface, a WiFi interface, a multimedia over coax alliance (MoCA) interface, a reduced gigabit media independent interface (RGMII), or generally any interface for connecting to a network. In this manner, electronic system 800 can be a part of one or more networks of computers (such as a local area network ("LAN"), a wide area network ("WAN"), or an Intranet, or a network of networks, such as the Internet. Any or all components of electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, for example, via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

In one or more implementations, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (for example, each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the subject disclosure.

What is claimed is:

1. A device comprising:
    a first processor configured to:
        establish a network connection with a client device through a first port of a network switch device to detect whether the network connection with the client device is associated with AV network traffic, wherein the first port bypasses a collocated second processor that is configured to connect to the client device through a second port of the network switch device, the network switch device being configured to resolve addresses associated with coupled devices and to configure network criteria for switching network traffic; and
        offload the network connection with the client device to the second processor responsive to a detection that the network connection is associated with AV network traffic, otherwise to perform network processing for the network connection when the network connection is not associated with the AV network traffic; and
    the second processor configured to:
        receive the network connection with the client device; and
        perform network processing of the AV network traffic received from the client device via the second port that is different than the first port.

2. The device of claim 1, wherein the first processor comprises a host processor and the second processor comprises circuitry dedicated to processing the AV network traffic.

3. The device of claim 1, further comprising:
    the network switch device configured to switch network traffic to the first processor via a first address or the second processor via a second address, wherein the network traffic comprises the AV network traffic, and the first address is different than the second address.

4. The device of claim 3, wherein the first processor is coupled to the network switch device via the first port and the second processor is coupled to the network switch device via the second port.

5. The device of claim 3, wherein the network switch device is further configured to initially switch the network traffic to the first processor, and the first processor is further configured to configure the network switch device to switch the AV network traffic to the second processor rather than the first processor when the network connection is associated with the AV network traffic.

6. The device of claim 1, wherein the network processing of the AV network traffic comprises at least one of: framing the AV network traffic, transcoding the AV network traffic, encrypting the AV network traffic, or decrypting the AV network traffic.

7. The device of claim 1, wherein determining whether the network connection is associated with AV network traffic comprises determining that the network connection includes a network protocol request for AV data, the second processor being configured to process and respond to the network protocol request.

8. The device of claim 7, wherein the network protocol request comprises a network request message, and wherein the second processor is configured to respond to the network request message by transmitting one or more response messages that include at least a portion of the requested AV data.

9. The device of claim 1, wherein the network connection is associated with a real-time streaming session, and the AV network traffic comprises packets provided in connection with the real-time streaming session.

10. A method comprising:
establishing a network connection with a device at a first processor through a first port of a network switch device that bypasses a second processor, the network switch device being configured to resolve addresses associated with coupled devices and to configure network criteria for switching network traffic;
determining, at the first processor, whether a request for a first type of network traffic is received via the network connection;
offloading the network connection by the first processor to the second processor when the request for the first type of network traffic is received via the network connection, the second processor connected to the device via the network connection through a second port of the network switch device that is different from the first port, the second port bypassing the first processor;
tearing down the network connection by the first processor after the offloading; and
processing network traffic associated with the network connection by the first processor when the request for the first type of network traffic is not received via the network connection.

11. The method of claim 10, wherein the first type of network traffic processing is AV network traffic processing, the first type of network traffic is AV network traffic, and a second type of network traffic processing is non-AV network traffic processing.

12. The method of claim 11, wherein the first processor comprises a host processor that processes the non-AV network traffic and the second processor comprises circuitry dedicated to processing the AV network traffic.

13. The method of claim 12, wherein offloading the network connection comprises:
configuring the network switch device to forward the AV network traffic of the network connection to the second processor via a second address instead of the first processor via a first address, wherein the first processor is associated with the first address at the network switch device and the second processor is associated with the second address at the network switch device, the second address being different than the first address.

14. The method of claim 12, wherein the AV network traffic is processed by the second processor contemporaneous with non-AV network traffic being processed by the first processor.

15. The method of claim 11, wherein determining whether the request for the first type of network traffic is received via the network connection comprises:
determining that the network connection includes a network protocol request for the AV network traffic, wherein the second processor is configured to process and respond to the network protocol request.

16. The method of claim 15, further comprising:
performing, by the second processor, network processing of the AV network traffic of the network connection when the request for the AV network traffic is received via the network connection.

17. The method of claim 15, wherein the network processing of the AV network traffic comprises at least one of: framing the AV network traffic, encrypting the AV network traffic, or decrypting the AV network traffic.

18. The method of claim 15, wherein the network connection is associated with a real-time streaming session, and the AV network traffic comprises packets provided in connection with the real-time streaming session.

19. A system comprising:
a network switch device comprising a first port coupled to a first processor, a second port coupled to a second processor, an address resolution module configured to resolve addresses associated with devices coupled to ports of the network switch device, and a configurable filters module configured to configure network criteria for switching network traffic, wherein the network switch device is configured to switch the network traffic to the first processor through the first port and to the second processor through the second port, wherein the network switch device is initially configured to switch the network traffic to the first processor through the first port;
the first processor that is configured to establish a network connection with a client device through the first port, to determine whether the network connection includes a request for AV data, to transfer the network connection to the second processor and to configure the network switch device to switch AV network traffic associated with the network connection to the second processor through the second port when the network connection includes the request for AV data, and to process non-AV network traffic associated with the network connection when the network connection does not include the request for AV data; and
the second processor that is configured to receive the network connection from the first processor and exclusively process the AV network traffic associated therewith.

20. The system of claim 19, wherein the ports of the network switch device include the first and second ports.

* * * * *